Feb. 19, 1957    R. M. ALLEN    2,781,609
TOY POWER LAWN MOWER
Filed Nov. 15, 1955    2 Sheets-Sheet 1
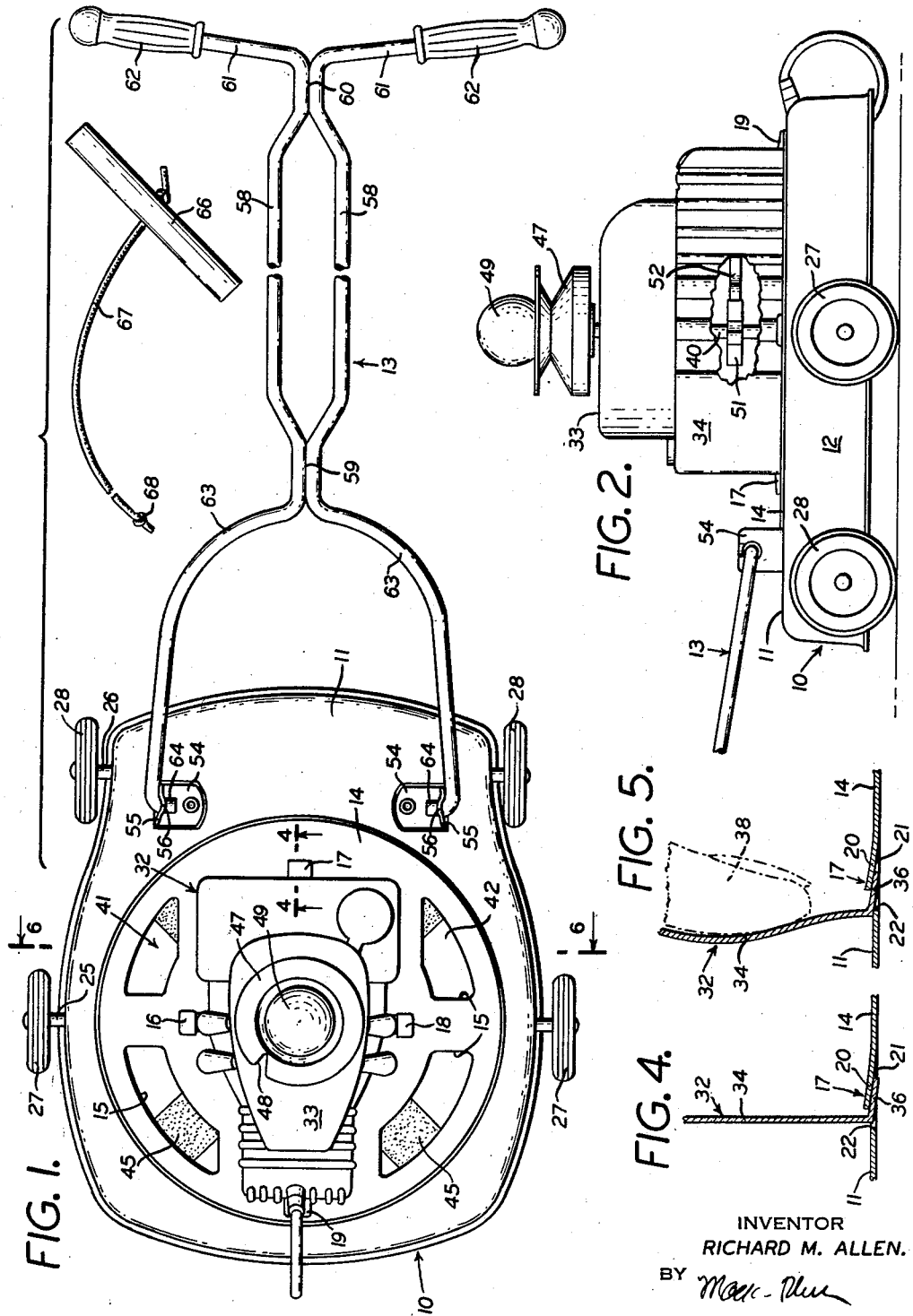
INVENTOR
RICHARD M. ALLEN.
BY
ATTORNEYS.

Feb. 19, 1957 R. M. ALLEN 2,781,609
TOY POWER LAWN MOWER
Filed Nov. 15, 1955 2 Sheets-Sheet 2
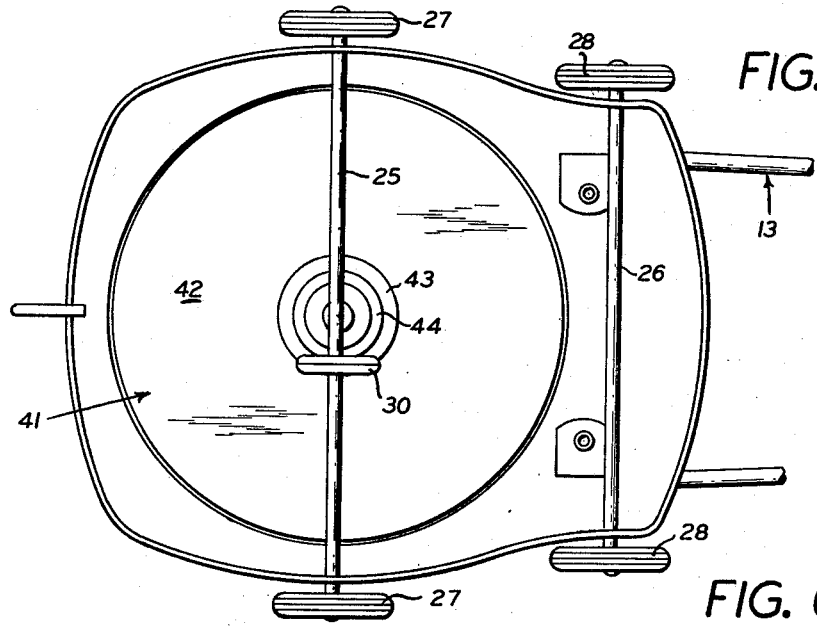
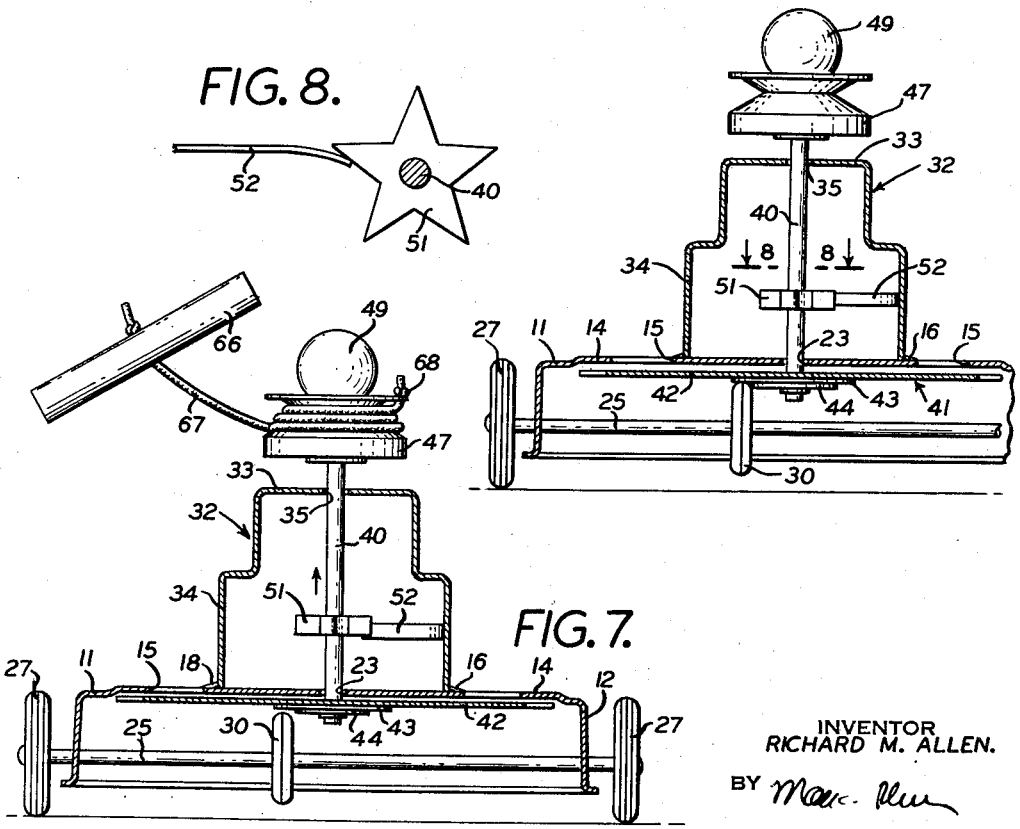
INVENTOR
RICHARD M. ALLEN.
ATTORNEYS.

United States Patent Office 2,781,609
Patented Feb. 19, 1957

2,781,609

TOY POWER LAWN MOWER

Richard M. Allen, East Hampton, Conn., assignor to The Gong Bell Manufacturing Company, East Hampton, Conn., a corporation of Connecticut Application November 15, 1955, Serial No. 546,877

8 Claims. (Cl. 46—39)

This invention relates generally to toys, and is particularly directed to the novel construction of a toy power lawn mower.

The particular embodiment of the present invention, which is illustrated in the drawings and which will be described hereinafter in greater detail, comprises generally a wheeled rotor housing adapted for movement along a ground surface, a simulated motor on the housing, and simulated motor starting means which is operatively connected to drive the rotor and propel the housing.

It is a general object of the present invention to provide a toy power lawn mower of the type described which accurately simulates the operation, sound and appearance of a real lawn mower, and is safe and highly entertaining for use by small children.

It is another object of the present invention to provide a toy power lawn mower having the advantageous characteristics mentioned in the foregoing paragraph, which can be quickly and easily disassembled so as to occupy a minimum of space in storage and transit, and which can be readily reassembled without special tools or skill when it is desired to use or display the device.

It is a further object of the present invention to provide a toy power lawn mower which is simple and rugged in construction, well adapted for unassisted use by small children, extremely durable and capable of withstanding rough handling, neat and attractive in appearance, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a top plan view showing a toy power lawn mower constructed in accordance with the present invention, partly broken away to conserve space, and illustrating a starter pull cord apart from the mower;

Fig. 2 is a side elevational view showing the motor of Fig. 1 with parts broken away for the conservation of space and clarity of understanding;

Fig. 3 is a bottom plan view of the mower of Figs. 1 and 2;

Fig. 4 is a fragmentary, sectional view, greatly enlarged, taken substantially along the line 4—4 of Fig. 1;

Fig. 5 is a fragmentary sectional view similar to Fig. 4 and showing an intermediate stage in the assembly or disassembly of the mower;

Fig. 6 is a partial, transverse sectional elevational view taken substantially along the line 6—6 of Fig. 1, and showing the device in an operating condition;

Fig. 7 is a sectional view similar to Fig. 6, and showing the device during the starting procedure; and Fig. 8 is a partial, sectional view taken substantially along the line 8—8 of Fig. 6.

Referring now more particularly to the drawings, and specifically to Fig. 1 thereof, a wheeled housing is there generally designated 10; and, a handle, generally designated 13, is detachably secured to the housing 10 for guiding movement of the latter.

The housing 10 has its underside open, and includes a generally flat, horizontally disposed top wall 11, and a side wall 12 extending peripherally about and depending from the top wall. A centrally located, circular portion 14 of the housing top wall 11 may be slightly raised, and formed with a plurality of circumferentially spaced arcuate cutouts or openings 15, see Fig. 1, and a central aperture or hole 23, see Figs. 6 and 7.

Also formed in the raised, central housing portion 14 are a plurality of spaced, inwardly opening pockets 16, 17, 18 and 19. In Fig. 1 it will be noted that the pockets 16 and 18 are in laterally spaced facing relation with respect to each other, while the pockets 17 and 19 are in forwardly and rearwardly spaced facing relation.

The pockets 16—19 in the housing top wall are all of substantially identical construction, so that a detailed description of one will suffice. As seen in Figs. 4 and 5, the pocket 17 is defined by an upset tab or portion 20 formed of the housing top wall and defining therein a downwardly facing recess 21. A slot or hole 22 is formed contiguous to and inwards of the upset portion 20 so as to communicate from the upper side of the housing top wall 11 with the downwardly facing recess 21.

A pair of laterally extending, generally horizontally disposed axle or shafts 25 and 26 extend rotatably through and beyond opposed side portions of the housing side wall 12. The axle or shaft 25 is located forwards of the axle 26, the former extending generally diametrically of the circular housing portion 14, while the latter is disposed rearwards of the circular housing portion. Fixed on opposite ends of the axle 25, outwards of the housing 10, are a pair of ground engageable wheels 27, 27 while an additional pair of ground engageable wheels 28, 28 are carried on opposite ends of the axle shaft 26 outwards of the housing 10. In Figs. 3, 6 and 7 it will be observed that an additional wheel 30 is circumposed about an intermediate portion of the axle 25 and spaced laterally from the central top wall opening 23 so as to be located eccentrically of the circular top wall portion 14. The wheel 30 is fixed by any suitable means to the axle shaft 25 for rotation therewith, and is of less diameter than the ground engageable wheels 27 so as to be spaced above a ground or supporting surface. Further, the periphery or rim of the wheel 30 is preferably fabricated of high friction material, such as rubber or the like, for purposes appearing presently.

Mounted on the upper side of the central housing top wall portion 14 is a hollow casing, generally designated 32, shaped and decorated to simulate a motor, say of the internal combustion type. The motor casing 32 is preferably fabricated of resiliently deflectable sheet material and formed with a top wall 33 and depending side walls 34. The bottom of the motor casing 32 is preferably entirely open, so that the lower edges of the side walls 34 seat or rest directly on the upper surface of the central top wall portion 14. As best seen in Fig. 1, the motor casing 32 is so configured, and the pockets 16—19 are so arranged, that each casing side wall 34 is disposed contiguous to and inwards of a respective one of the pockets. Formed in the top wall 33 of the motor casing 32, directly above and in vertical alignment with the housing top wall aperture 23 is a through aperture or hole 35.

Extending laterally outwards from the lower edge of each motor casing side wall 34 is a securing tab or tongue 36, best seen in Figs. 4 and 5. In Fig. 4 it will be noted that the outwardly extending tab 36 is received in the slot 17 and in the recess 21, snugly engaging the undersurface of the upset portion 20. As a similar securing tab is provided on each side of the motor casing 32 for reception in the adjacent pocket 16—19, it will be apparent that the tabs 36 serve to retain the motor casing in position on the housing 10. However, removal of the motor casing 32 from the housing 10 may be quickly and easily accomplished by mere inward deflection of the motor casing walls 34, as by the actuating finger 38 of an operator in Fig. 5, to withdraw each of the tabs 36 from its respective pocket. That is, the motor casing side walls 34 may be manually deflected inwards due to their resilient nature, which characteristic also serves to releasably retain the tabs 36 in their respective pockets during use.

Extending generally vertically through the motor casing 32 and slidably and rotatably received in the central housing aperture 23 and aligned motor casing aperture 35 is a drive shaft or rod 40. As is apparent in Figs. 6 and 7, the upper end of the drive shaft 40 extends upwards beyond the top wall 33 of the motor casing 32, and the lower drive shaft end extends downwards below the top housing wall portion 14 into the housing 11. Spaced below, but closely underlying the central housing top wall portion 14, within the housing 10, and fixedly circumposed coaxially about the lower end portion of the drive shaft 40 is a rotor, generally designated 41. The rotor includes a relatively large circular sheet, plate or disc 42, a relatively small intermediate annular plate 43 in facing engagement with the undersurface of the disc 42, and an even smaller annular plate 44 in facing engagement with the undersurface of the plate 43. The disc 42 and plates 43 and 44 are all preferably fixedly circumposed coaxially about the lower end portion of the shaft 40 for rotation and vertical shifting movement with the shaft. It will be noted that the undersurface of the rotor plate 43 is disposed to rest on and frictionally engage with the periphery of the friction wheel 30 when the shaft 40 and rotor 41 are in their lowermost position of vertical movement. In Fig. 1, through the housing top wall cutouts 15 are partially seen radially extending colored strips or markings 45, which are provided on the upper surface of the circular sheet or plate 42 to present the appearance of cutting blades through the housing cutouts.

Fixedly secured on the upper end of the shaft 40, above the motor casing top wall 33, is a peripherally grooved wheel, pulley or sheave 47, preferably having a radial notch 48 opening upwards from the pulley groove. A knob or head 49 may be fixed on top of the pulley 47, if desired.

Fixedly circumposed about the drive shaft 40, interiorly of the motor casing 32, is a peripherally toothed wheel 51, which may have the star-like configuration shown in Fig. 8. A resiliently deflectable tongue, strip or leaf spring 52 is arranged interiorly of the motor casing 32, with one end fixed to a motor casing side wall 34 and the other end extending into engagement with the teeth of wheel 51. Hence, upon rotation of the shaft 40 and toothed wheel 51, the tongue 52 will be deflected to ride over successive teeth of the wheel and released to swing back into engagement with the wheel teeth, and thereby produce a sound simulating that of an operating motor.

A pair of laterally aligned, spaced brackets 54, 54 are fixed to the housing top wall 11 rearwards of the central raised portion 14, as by rivets or other suitable means, and are each provided with an apertured, upstanding lug or ear 55. The apertures of the ears 55 are in lateral alignment with each other; and, the ears are each formed with an inwardly recessed or depressed portion 56 extending generally upwards from the ear aperture.

The handle 13 is fabricated of a pair of elongate tubular members 58, 58 fixedly secured together by welding or other suitable means intermediate their ends, as at 59 and 60. The upper end portions of the elongate members 58, 58 are angulated outwards, as at 61, 61 and may be provided on their distal portions with rubber hand grips 62, 62, or the like. The lower end portions 63, 63 of the tubes 58, 58 are bowed laterally outwards and formed with inturned, generally aligned terminal portions 64, 64, which each engage inwards through a respective ear 56, 56 to connect the handle 13 to the housing 10 for rotation about the axis of the terminal portions 64, 64. The tubular members 58 are slightly resilient so as to enable the lower, outwardly bowed portions 63 to be spread apart for removal of the terminal tube portions 64 from their respective ears 56. Further, the resiliency of the tubular handle members 58 enables the handle to be retained in an upstanding position by engagement of the tube portions adjacent to the terminal portions 64 in the respective depressions 56. That is, when the handle 13 is swung upwards, the tube portions adjacent to the terminal portion 64 will enter the depressions 56 and thereby retain the handle in its upwardly swung position. Of course, the handle may be manually removed from its upstanding position by merely exerting sufficient force on the handle to swing the latter and remove the bowed portions from the ear depressions.

A starting pull cord is shown in Fig. 1 as comprising an elongate handle or block 66, and a cord or rope 67 connected at one end to an intermediate portion of the handle, and having its other end, remote from the handle, provided with a knot 68 or other suitable enlargement.

In operation, the cord 67 is wound about the pulley 47, being received in the pulley groove, and preferably with the knotted cord end extending upwards through the pulley notch 48, as seen in Fig. 7. The pull cord handle 66 may then be manually grasped and pulled upward and outward in the natural manner. This will effect slight elevation or upward vertical shifting of the shaft 40, pulley 47 and rotor 41 to an upper position shown in Fig. 7, and also simultaneously effects rotation of the drive shaft, pulley and rotor. It will be noted in Fig. 7 that the rotor 41, and more specifically the plate 43, has been disengaged from or raised out of engagement with the friction wheel 30 so that the pulley, shaft and rotor may rotate without the resistance which would otherwise be imparted by the friction wheel. However, when the upward force of the pull cord 67 is removed from the pulley 47, as when the pull cord separates from the pulley, the pulley, shaft 40, and rotor 41 will fall until the rotor plate 43 engages with and rests on the periphery of the friction wheel 30. The angular momentum of the rotor 41, and the other parts rotating therewith, is thereby imparted to the friction wheel to rotate the latter, and consequently the axle 25 and ground engageable wheels 27. This, of course, effects propulsion of the housing 10 along the supporting surface. Viewed otherwise, the rotary movement imparted to the pulley 47, shaft 40 and rotor 41, is transmitted by the friction wheel 30 to the axle 25 and ground engageable wheels 27 to effect rolling movement of the latter, and hence of the housing 10. As the wheel 30, which transmits motion to the axle 25, is only frictionally driven by the rotor 41, the rate of movement of the device may be easily governed by an operator, as a slight restraining force on the handle will cause slippage between the rotor and transmission wheel.

It is, of course, appreciated that the toothed wheel 51 and spring strip 52 cooperate throughout rotary movement of the shaft 40 to provide a motor simulating sound.

In addition to the above described mode of operation, the shaft may be elevated and rotated without use of the pull cord 67, by mere manual actuation of the knob 49. Further, the starting operation may be dispensed with entirely if desired, as conventional pushing or pulling of the housing 10 by actuation of the handle 13 will effect rotation of the ground engageable wheels 27 and their axle 25. The friction wheel 30, rotating with the axle 25, will frictionally transmit rotary motion to the motor 41. This of course effects rotation of the shaft 40, toothed wheel 51 and pulley 47.

Hence, the rotor 41 will be rotating throughout these various modes of operation. As the radial markings 45 on the upper surface of the rotor disc 42 are visible through the housing cutouts 15, there will be presented to an observer the appearance of cutting blades rotating in the housing, in the manner of a real power mower.

From the foregoing, it is seen that the present invention provides a toy power mower which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A toy power mower comprising a rotor housing, at least one axle journaled in said housing, ground engageable wheels carried by said axle for rotation therewith, a simulated motor casing mounted on said housing, an upstanding shaft extending rotatably through said motor casing having its upper end projecting above said motor casing and its lower end depending into said housing, said shaft being mounted for limited free vertical shifting movement, a rotor including a horizontally disposed plate having radially extending markings carried on the lower end of said shaft for rotation and vertical shifting movement therewith, transmission means carried by said axle for rotation therewith and arranged under said rotor to be engaged by and disengaged from the latter when said rotor is moved into and out of its lower position of vertical shifting movement, rotation of said rotor and shaft in their lower position of vertical shifting movement serving to rotate said axle and wheels for propelling said housing along a supporting surface, radially extending openings in said housing for exposing said markings, and a starter carried on the upper end of said shaft and rotor for rotation and vertical shifting movement with said shaft and adapted to be simultaneously elevated and rotated by a pull cord, whereby said rotor is adapted to be rotated in an upper position of its vertical shifting movement and allowed to drop to its lower vertical position into driving engagement with said transmission means for propelling said housing.

2. A toy power mower according to claim 1, said transmission means comprising a friction wheel on said axle adapted to be frictionally engaged by said rotor when the latter is in its lower vertical position, whereby rotation of said rotor effects rotation of said friction wheel and axle.

3. A toy power mower according to claim 1, said starter comprising a peripherally grooved sheave fixedly circumposed about the upper end of said shaft and adapted to receive a pull cord wound thereabout.

4. A toy power mower according to claim 1, in combination with a toothed wheel disposed within said simulated motor casing and circumposed about said drive shaft for rotation therewith, and a resiliently yieldable tongue having one end fixed interiorly of said motor casing and having its other end engageable with and adapted to ride over the teeth of said toothed wheel upon rotation of the latter, said tongue serving to produce a motor simulating sound when said toothed wheel is rotated.

5. A toy power mower comprising a rotor housing having a top wall and a depending peripheral side wall, a pair of generally horizontally disposed forwardly and rearwardly spaced axles journaled in said housing, ground engageable wheels carried by said axles, a friction wheel fixed to one of said axles interiorly of said housing, a hollow simulated motor casing on the top wall of said housing, a generally vertically disposed shaft extending rotatably through said motor casing having its upper end projecting above said motor casing and having its lower end depending through said housing top wall into said housing, said shaft being mounted for limited free vertical shifting movement, a rotor carried on the lower end of said shaft for rotation and vertical shifting movement therewith, said rotor being spaced above said friction wheel in an upper position of vertical shaft movement and resting on and frictionally engaging with the periphery of said friction wheel in a lower position of vertical shaft movement, and a starter exteriorly of said motor casing and carried on the upper end of said shaft for rotation and vertical shifting movement with the latter, said starter being adapted to be simultaneously elevated and rotated by a pull cord to effect rotation of said rotor and allow the latter to drop into frictional engagement with said friction wheel for rotating the associated axle, said rotor comprising a generally horizontally disposed plate having radially extending markings on its upper surface, said housing top wall being formed with a plurality of through openings affording visual access to the interior of said housing and the upper surface of said rotor plates, whereby said rotor plate presents the appearance of a cutting blade when viewed through said housing top wall openings.

6. A toy power mower according to claim 5, said housing top wall being formed with a plurality of inwardly facing pockets spaced about said motor casing, said motor casing opening downwards with its lower edge seated on said housing top wall and being fabricated of resiliently deflectable sheet material, and a plurality of laterally outwardly extending tabs spaced about the lower edge of said motor casing and removably engaged in said pockets, said tabs being resiliently retained in said pockets by the resiliency of the motor casing walls and removable from said pockets by inward deflection of the motor casing walls.

7. A toy power mower according to claim 5, said starter comprising a peripherally grooved sheave fixedly circumposed about the upper end of said shaft and adapted to receive a pull cord wound thereabout.

8. A toy power mower according to claim 5, in combination with a toothed wheel disposed within said simulated motor casing and circumposed about said drive shaft for rotation therewith, and a resiliently yieldable tongue having one end fixed interiorly of said motor casing and having its other end engageable with and adapted to ride over the teeth of said toothed wheel upon rotation of the latter, said tongue serving to produce a motor simulating sound when said toothed wheel is rotated.

References Cited in the file of this patent

UNITED STATES PATENTS

| 1,867,052 | Bergstrand | July 12, 1932 |
| 2,248,390 | Schaad | July 8, 1941 |
| 2,411,596 | Shapiro et al. | Nov. 26, 1946 |

FOREIGN PATENTS

| 621,266 | Great Britain | Apr. 6, 1949 |